Nov. 29, 1927.

H. PETERSEN 1,650,722

CULTIVATOR

Filed May 19, 1925　　3 Sheets-Sheet 1

Inventor
Henry Petersen.

By E. H. Bond
Attorney

Nov. 29, 1927.
H. PETERSEN
1,650,722
CULTIVATOR
Filed May 19, 1925
3 Sheets-Sheet 2
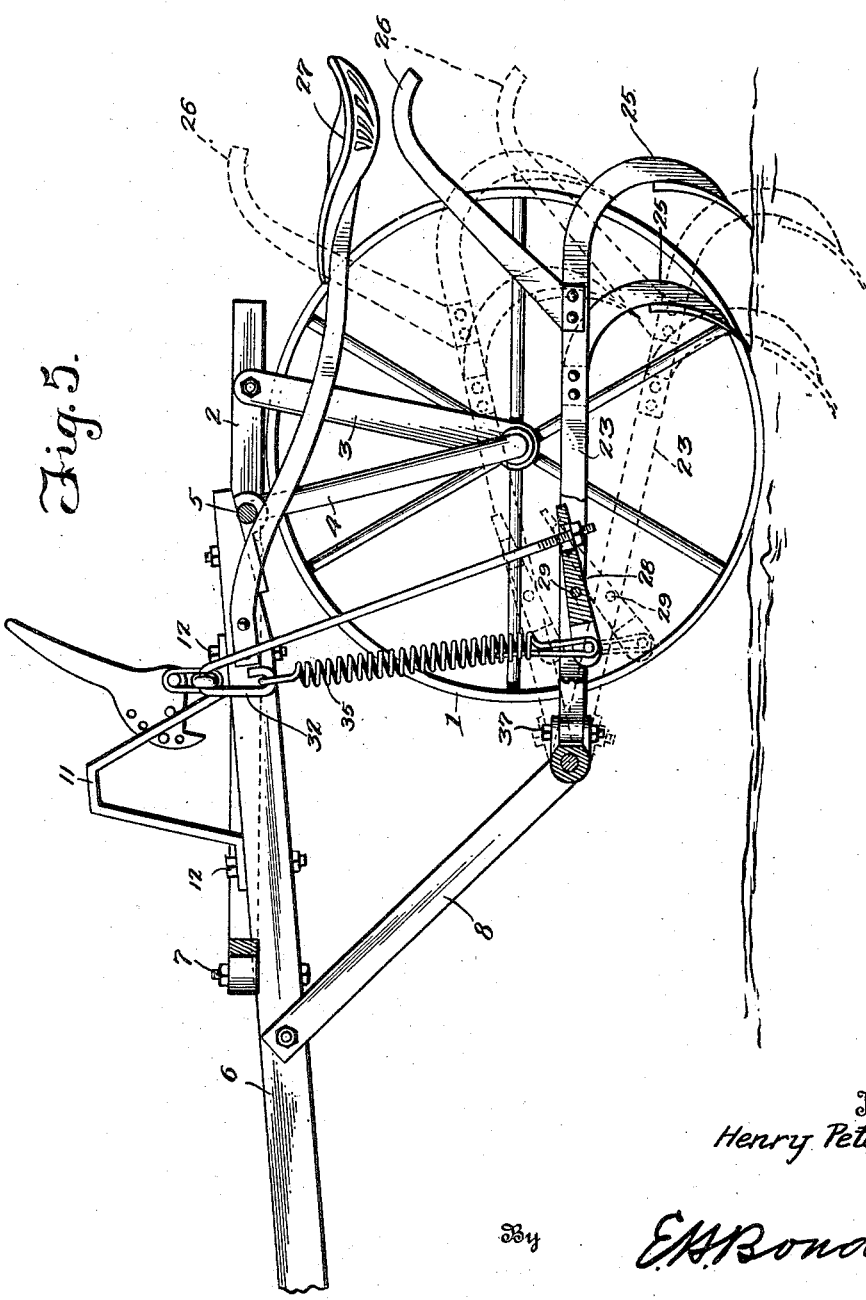
Inventor
Henry Petersen.
By E. H. Bond
Attorney

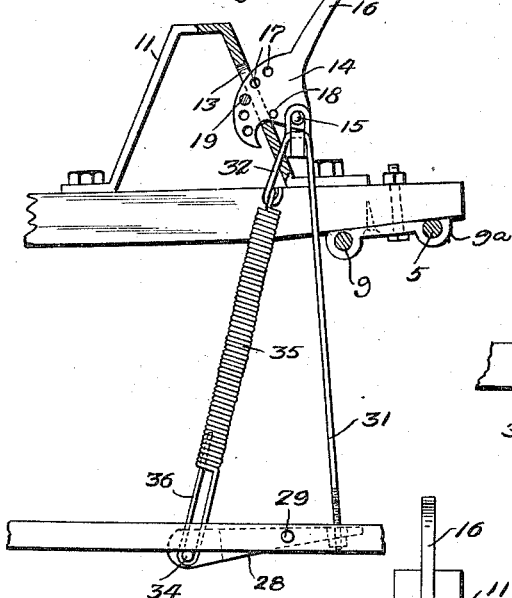

Patented Nov. 29, 1927.

1,650,722

UNITED STATES PATENT OFFICE.

HENRY PETERSEN, OF MOUNT AUBURN, IOWA.

CULTIVATOR.

Application filed May 19, 1925. Serial No. 31,306.

This invention relates to certain new and useful improvements in cultivators, and more particularly to that class of cultivators known as combined walking and riding cultivators, and it has for its objects among others to provide an improved implement of this general type in which provision is made for the tensioning and adjustment of the shovel beams so that they will normally seek their usual depth of cultivation, but in case they meet an obstruction they must be forced downward further by extra force applied by the operator or driver, but when the extra force of the operator is released they will automatically return to their former depth of cultivation. The shovel beams are spring-supported, the spring tension being such and the parts so adjusted that the weight of the shovel beams when fully equipped for service will of their own weight just balance the tension of the springs until the eye of the small equalizer pivotally mounted between the shovel beams with one end connected with the spring and the eye end playing on the rod strikes the stop at the lower end of the rod which carries the shovel beams the required depth of cultivation. A part of the weight of the beams is now carried by the rods and a part by the said springs, thereby doubling the force to bring the springs into action when so required by reason of obstructions that may be caught by or gathered upon the points of the shovels, such as weeds or the like. As soon as extra force by the operator is released from said beams the latter seek their normal level, and they thus remain at their usual depth of cultivation until again depressed. The said rods serve to protect the spring from undue or over strain or other liability of injury or abuse.

I employ an upper main equalizer which is provided near its outer ends with teeth or notches to provide for proper or necessary adjustment of the upper ends of the springs to prevent the shovels from crowding in or out from the row of plants. The depth of cultivation of the shovels is provided for by a lever mounted at the centre of the upper balancing equalizing lever or bar.

The invention has for a further object to provide a simple and efficient construction whereby the above desired ends are accomplished. The present improvement is in the nature of an attachment which can be readily applied to cultivators already in use at small cost and by unskilled labor. Few parts are employed and those of such a nature and arrangement as not to be liable to get out of order or deranged, simple and durable, and readily repaired or parts replaced when occasion may require.

Other objects and advantages of the invention will hereinafter appear and the novel features thereof will be specially defined by the appended claims.

The invention, in its preferred form, is clearly illustrated in the accompanying drawings, which, with the numerals of reference marked thereon, form a part of this specification, and in which Figure 1 is a perspective view of a cultivator embodying my present improvements.

Figure 2 is a detail in vertical section, with parts in elevation, showing one of the springs and its rod, and the lower equalizer.

Figure 3 is a detail of the upper equalizer and its adjusting lever and its springs and rods, parts being broken away.

Figure 4 is an enlarged view, partly in elevation and partly in section, showing the lower equalizer and the attachment of the rod and spring.

Figure 5 is a side elevation with parts in vertical section.

Like numerals of reference indicate like parts throughout the several views in which they appear.

Figure 1:
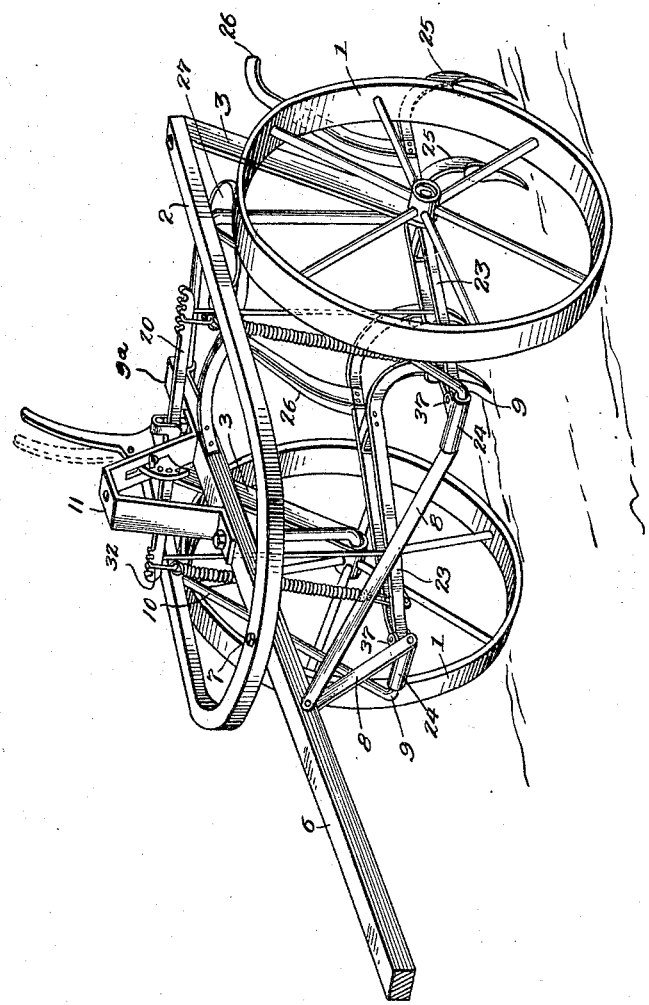

Referring to the drawings: 1 designates the wheels, which may be of any well known or approved type; 2 the frame which likewise may be of any approved form of construction; 3 the supports thereof; 4 is the arched axle carrying the wheels and its upper cross portion 5 having bearings in the opposite sides of the frame in usual manner; 6 is the tongue secured to the forward portion of the frame by suitable means as bolt 7, and at its rear end having the cross portion of the arched axle secured therebeneath.

Extending from opposite sides of the tongue, being bolted thereto at their upper ends, are the inclined members 8, the lower ends of which form supports for the terminals 9 of the yoke 10, the cross portion of which is secured to the under side of the tongue near its rear end as by suitable clips or the like 9ª, see Figure 1.

Mounted upon the tongue at a point near the front portion of the frame is an arched member 11, which serves as a support for the pivot of the doubletree, not shown, the same being secured rigidly to the tongue as by bolts 12—12, (see Fig. 5) and the rear member of this is provided with an elongated slot 13 through which works the end of a segmental member 14 pivoted at 15 and having a handle 16, and a plurality of openings 17 following the curvature of the upper face thereof, as seen best in Figure 2. It is also provided with a stop pin or the like 18, adapted for engagement with the adjacent face of the member 11 to limit the forward movement of the segmental member. 19 is a removable pin or the like, adapted for cooperation with any one of the holes 17 in the segmental member to limit the rearward movement of said member, and is thus adjustable to vary the depth of cultivation of the earth engaging members soon to be described. 20 is a transverse bar carried by the segmental member, being designed to be moved vertically up or down by actuation of said member, and this bar may be relatively rigid or it may be pivotally mounted between its ends, in the present instance shown substantially at its midlength at at 21, so as to oscillate in a vertical plane, as indicated by dotted lines in Figure 3. When thus pivoted this member 20 serves as an equalizer. It is provided at opposite ends upon its upper face with a plurality of notches or the like 22, for a purpose soon to be described. 23 are the plow beams of any suitable or well known form of construction. At their forward ends they are pivotedly mounted upon the cross portions 9 of the yoke 10, as seen best at 24 in Figure 1, so as to have swinging movement thereupon. Any suitable form of pivotal mounting for these beams may be resorted to. The earth engaging members 25 may also be of any well known approved form of construction. Each beam is provided with a handle 26 to the rear of the axle and disposed convenient to the operator from the seat 27, which may be of any approved form and supported in any suitable way. 28 is an equalizer or a member pivotedly mounted between its ends, as at 29, between the side members of the members 25 (see Figures 2, 4 and 5), it being understood that there is an equalizer between the side members of each beam. The rear end of each equalizer 28 has an elongated slot 30, through which loosely plays a rod 31, the upper end of which is bent upon itself to form a hook or the like 32, which is adapted to be engaged with any one of the notches 22 of the cross member 20, being shiftable from one to another as occasion may require, for a purpose soon to be described. The lower end of the rod 31 is provided with suitable means, as in the present instance a nut 33, which is adapted to engage the under side of the member 28 to limit the upward movement of the rod and to prevent disengagement of the two parts.

The equalizer 28 is provided near its front end with a transverse pin or the like 34, adapted to engage the under side of the side members of the beam to limit the movement of the equalizer.

Connected with the member 32 of each rod 31 is a spring 35 (see for instance Figures 2 and 5), the lower end of the spring being in the present instance formed with an elongated loop 36 which receives the pin 34 just described. (See Figures 2, 4 and 5.)

Each beam is mounted upon a vertical pivot 37 (see Figures 1 and 5), so that in addition to this vertical movement it is capable of movement laterally, as will be readily understood.

With the parts constructed and arranged substantially as hereinbefore described and shown the operation briefly stated is as follows:

Normally the parts are so disposed that the cushioning effect of the springs is the same whether the beams move up or down and in operation the shovels or other earth implements normally seek their usual or proper depth of cultivation, the engagement of the equalizers with the abutments on the lower ends of the rods insuring this effect. In case the shovels meet with an obstruction, such as the collection of weeds or other objects, the operator applies additional force by downward pressure upon the handles, when by engagement of the equalizers with their abutments the weight is divided, a part being thrown upon the rod and a part upon the spring, this being brought about by movement of the equalizer upon its pivot more or less. When this obstruction is passed or the plows are cleared of the same, the parts automatically return to their normal position and the former depth of cultivation is assured. The depth of normal cultivation can be easily regulated greater or less by manipulation of the depth adjusting lever 16 and changing the pin 19 into the requisite hole in the segmental member 14.

The beams are prevented from undue lateral movement in either direction, such as in case of crowding, by adjustment of the loops 32 into the requisite notch 22 of the member 20, either outward or inward as occasion may require.

It is to be understood that when the parts have been so moved that the equalizer 28 comes in contact with the abutment 33 thereon and part of the weight of the beams is carried by the rods and part by the springs, the force required to bring the springs into action is practically doubled. but this force is automatically overcome when the obstruction is passed and the extra force by the operator is removed, In case the member 20 is pivotedly mounted it serves as an equalizer and allows of independent action of each side or beam; the operation and result, however, is substantially the same as when the member 20 is not mounted for oscillation.

Modifications in detail, proportions, and relative arrangement of parts, may be resorted to without departing from the spirit of the invention or sacrificing any of its advantages.

What is claimed as new is:

1. In a cultivator, pivoted beams, resilient means, pivoted means carried by the beams and with which said resilient means are connected, and an equalizer pivoted on the frame of the cultivator and cooperating with said pivoted member, and a rod loosely movable through the rear end of the equalizer, the said beams being depressible beyond the normal depth by force applied by the operator when an obstruction is met.

2. In a cultivator, a pivoted beam, and a pivoted member carried thereby, a spring connected with the pivoted member upon one side of its pivot, and a member having loose connection with the pivoted member upon the other side of the pivot, and an abutment on the lower end of the last mentioned member to limit independent movement thereof.

3. In a cultivator, a pivoted plow beam, a pivoted member thereon, and resilient means connected with one end of the pivoted member, and a member substantially parallel with the spring and having limited loose connection with the pivoted member.

4. In a cultivator, a pivoted beam, an oscillatory member carried thereby, a spring connected with the said member upon one side of its pivot, a rod having limited sliding connection with the pivoted member upon the other side of its pivot, and a transverse member connected to said spring and rod supported from a point above said pivoted member and vertically adjustable.

5. In a cultivator, a pivoted beam, an oscillatory member carried thereby, a spring connected with the said member upon one side of its pivot, a rod having limited sliding connection with the pivoted member upon the other side of its pivot, and a transverse member connected to said spring and rod supported from a point above said pivoted member and vertically adjustable, said transverse member being resiliently connected and pivotedly mounted to serve as an equalizer.

6. In a cultivator, a transverse member mounted upon the tongue, means for varying the height thereof, pivotedly mounted beams, an equalizer carried by each beam, and a spring connected with said transverse member, and a rod carried by each end of said transverse member, each having connection with an equalizer upon opposite sides of its pivot.

7. In a cultivator, a cross member mounted upon the tongue, means for varying the height thereof, pivotedly mounted beams, an equalizer carried by each beam, and a spring, and a rod carried by each end of said transverse member, each having connection with an equalizer upon opposite sides of its pivot, said transverse member having a plurality of notches for adjustment of the connections of said springs and rods therewith.

8. In a cultivator, a pivoted beam, a centrally-disposed pivoted member carried thereby, a spring connected with the pivoted member upon one side of its pivot, and a member extending substantially parallel with said spring and having loose connection with the pivoted member upon the other side of the pivot thereof.

9. In a cultivator, a pivoted beam, a pivoted member thereon, resilient means connected with one end of the pivoted member, a member substantially parallel with said resilient means and having limited loose connection with the pivoted member, and a stop carried by the pivoted member upon one side of its pivot.

10. In a cultivator, a pivoted beam, an oscillatory member carried thereby, a spring connected with the said member upon one side of its pivot, and a rod having limited sliding connection with the pivoted member upon the other side of its pivot.

In testimony whereof I affix my signature.

HENRY PETERSEN.